United States Patent [19]

Groom

[11] Patent Number: 5,003,211

[45] Date of Patent: Mar. 26, 1991

[54] PERMANENT MAGNET FLUX-BIASED MAGNETIC ACTUATOR WITH FLUX FEEDBACK

[75] Inventor: Nelson J. Groom, White Marsh, Va.

[73] Assignee: The United States of America as represented by the Administrator of the National Aeronautics and Space Administration, Washington, D.C.

[21] Appl. No.: 405,168

[22] Filed: Sep. 11, 1989

[51] Int. Cl.$^5$ ............................................... H02K 7/09
[52] U.S. Cl. ................................................. 310/90.5
[58] Field of Search ........................ 310/90.5, DIG. 3; 324/207.2, 207.25

[56] References Cited

U.S. PATENT DOCUMENTS

| 4,629,262 | 12/1986 | Hamilton . | |
|---|---|---|---|
| 4,634,191 | 1/1987 | Studer | 310/90.5 |
| 4,642,500 | 2/1987 | Higuchi | 310/90.5 |
| 4,642,501 | 2/1987 | Kral et al. . | |

OTHER PUBLICATIONS

NASA Conference Publication 2346, Groom, Nelson Jr., "Overview of Magnetic Bearing Control and Linearization Approaches for Annular Magnetically Suspended Devices" (1984); 2/7-9/1984.

Primary Examiner—R. Skudy
Attorney, Agent, or Firm—Harold W. Adams; John R. Manning

[57] ABSTRACT

The invention is a permanent magnet flux-biased magnetic actuator with flux feedback for adjustably suspending an element on a single axis. The magnetic actuator includes a pair of opposing electromagnets 11' and 12' providing bi-directional forces along the single axis to the suspended element. Permanent magnets in flux feedback loops from the opposing electromagnets establish a reference permanent magnet flux-bias to linearize the force characteristics of the electromagnets to extend the linear range of the actuator without the need for continuous bias currents in said electromagnets.

2 Claims, 2 Drawing Sheets

PERMANENT MAGNET FLUX-BIASED MAGNETIC ACTUATOR WITH FLUX FEEDBACK

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention is a Permanent Magnet (PM) Flux-Biased Magnetic Actuator with Flux Feedback for providing magnetic suspension and control forces having a linear transfer characteristic between force command and force output over a large gap range. Applications for the invention may include magnetic actuators for shape and figure control of antennas and precision segmented reflectors, magnetic suspension for momentum/energy storage devices, and payload pointing, isolation, and control systems.

2. Description of the Prior Art

Typically, the force produced by a conventional single magnetic suspension actuator element is an attractive force that is directly proportional to the square of the flux in the magnetic gap. The flux, under ideal assumptions, is directly proportional to the current in the actuator element coil and inversely proportional to the magnetic gap. In order to produce a bi-directional force, prior art devices utilize two or more actuator element pairs acting together along a single axis.

Many different approaches for controlling and linearizing the force produced by this type of magnetic actuator have been investigated as described in U.S. Pat. Nos. 4,629,262 and 4,642,501 to Brain J. Hamiliton and Kevin D. Kral, respectively, and NASA Publication No. CP-2346, dated Nov., 1984, entitled "Overview of Magnetic Bearing Control and Linearization Approaches for Annular Magnetically Suspended Devices" by the inventor herein, Nelson J. Groom.

In conventional applications, current feedback has typically been used to control the current in the actuator coils and thus indirectly the flux in the magnetic actuator gaps. In terms of the simplicity and efficiency of known magnetic actuators, the use of a permanent magnet PM to provide flux bias approach has been found to have certain advantages because: (1) a linear relationship between force and current at a given operating point can be obtained by simply controlling the actuator elements differentially about the bias flux established by the permanent magnet, PM; and (2) since the bias flux is supplied by permanent magnets PM, the continuous power dissipation that results when bias currents are used is eliminated.

The major disadvantage of known PM flux biased magnetic actuators such as described in the aforementioned NASA publication, No. CP-2346, is that the equivalent linear actuator gain, which is exhibited at a given operating point, changes when the operating point changes. This has prevented PM flux biasing from being used in applications which require constant actuator gains over a large gap range. Also, from a control system standpoint, the conventional PM flux biased actuator has a minimum bandwidth requirement which can limit or prevent its use.

As is known, a continuous, variable bias current approach requires complicated electronic circuitry and the use of analog function modules such as multipliers which in turn can introduce accuracy problems. The aforementioned U.S. Pat. No. 4,629,262 to Hamilton discloses an improvement on the variable bias current approach which uses a force sensor in a feedback loop to provide both displacement information and force linearization.

However, in addition to the disadvantages inherent in the variable bias current approach, the use of a force sensor as so described requires mounting the force sensors on the suspended element. This means that the output signal from the sensors must be transfered across the gap by cable or some type of complex, noncontacting signal transmission technique. Also, the commercially available force sensors that meet the necessary accuracy and bandwidth requirements are fragile, expensive, and require complicated support electronics.

An improvement on both the force feedback approach and variable bias current approach is disclosed in U.S. Pat. No. 4,642,501 to Kral et al in which flux feedback is used to adjust the continuous bias currents while avoiding the use of a force sensor and necessary complicated gap/current computations. The use of continuous bias currents still results in a continuous power dissipation in each of the actuator elements. This as mentioned can significantly reduce the efficiency of the system and lead to heat related problems.

For example, to minimize peak power the bias current will in general be half the maximum current driven through a given coil. This means that for maximum force in a given direction, the current in one coil will increase from a value equal to the bias current to a value equal to maximum and the current in the opposite coil will go to zero. Since the maximum power dissipation is equal to the maximum current squared time the resistance of the coil, the nominal continuous power dissipated in one coil due to the bias current will be one-fourth the maximum (if the suspended element is centered and the force command is zero). For one pair of opposing elements then the total quiescent power dissipation would be one-half the value required to generate maximum force in a given direction.

OBJECTS AND SUMMARY OF THE INVENTION

An object of this invention is to avoid the limitations of the prior art by using permanent magnets to supply a reference bias flux to linearize the force characteristic of a magnetic actuator for a suspended element. The magnetic actuator generally includes a pair of opposing electromagnets for providing a bi-directional force along a given axis, in combination with flux feedback means which automatically adjusts the opposing bias fields of the electromagnets when the suspended element is moved off the nominal operating point. Permanent magnets in the electromagnets establish PM flux biasing which eliminates the need for continuous bias currents and thus reduces power dissipation by the actuator while extending the linear range and eliminating minimum bandwidth of the actuator. The use of a current feedback loop results in even greater control of the resulting actuator force over the extended linear range.

BRIEF DESCRIPTION OF THE DRAWINGS

The above and numerous other objects and advantages of the invention will become apparent from the following description when read in view of the appended drawings wherein.

BRIEF DESCRIPTION OF THE INVENTION

Figure 1:
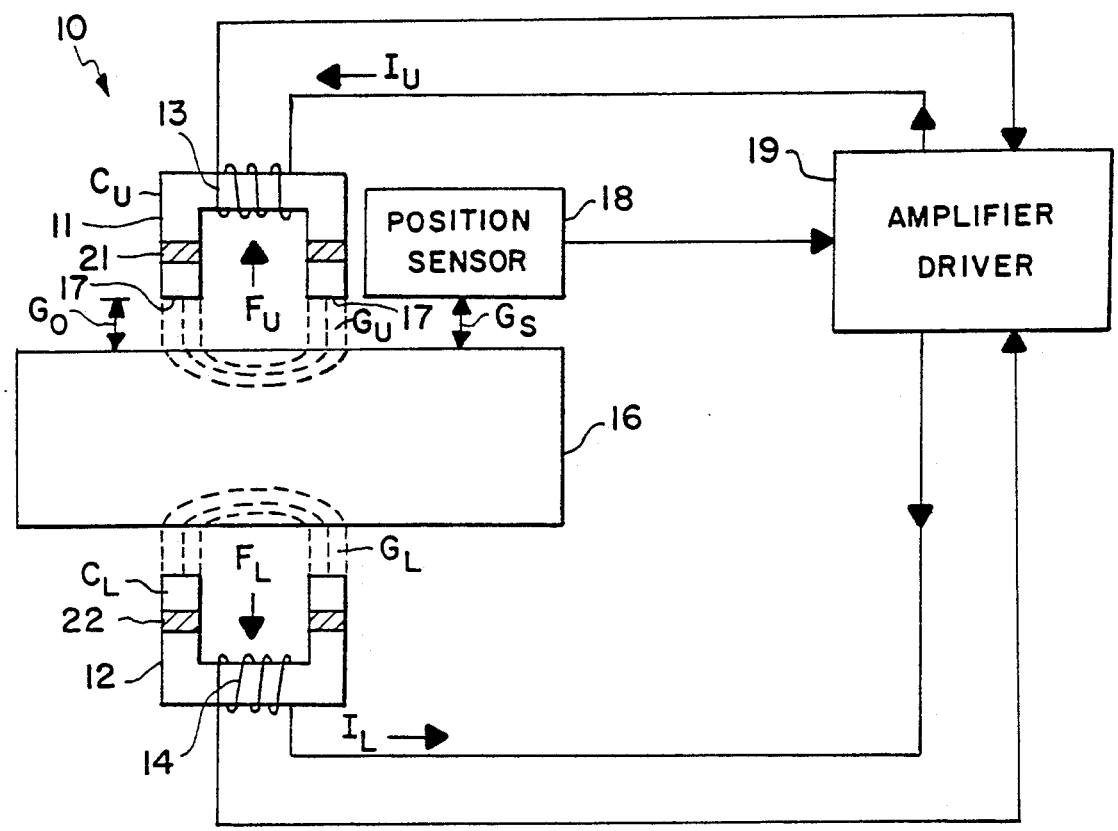
FIG. 1 is a schematic illustration of a prior art permanent magnet flux-biased magnetic actuator.

The principles of operation of a conventional magnetic actuator 10 as illustrated in FIG. 1, a simplified schematic of a prior art device are known. As shown, upper and lower electromagnets 11 and 12 include coils 13 and 14 in which currents $I_U$ and $I_L$ produce magnetic forces $F_U$ and $F_L$ on a suspended magnetically attractive element 16 positioned in the center between the bearing elements or electromagnets 11 and 12 at a gap distance $G_O$ from the top electromagnet pole face 17. Since the electromagnets 11 and 12 produce an attractive force only on the element 16, both are required to produce the bi-directional forces $F_U$ and $F_L$.

A conventional position sensor 18 which may be a Multi-Vit Displacement System, KD2300 Series manufactured by Kaman Sciences Corporation, 1500 Garden of the Gods Road, Colorado Springs, Colo. 80907 measures the displacement $G_S$ of the suspended element 16 with respect to the centered position of the gap distance $G_O$. As is well known, position information from sensor 18 is amplified by a conventional amplifier driver circuit 19 to provide for the active control of the position of the suspended element 16 by changing the continuous currents $I_L$ and $I_U$ in the coils 13 and 14.

The following force equations of the magnetic actuator 10 are based upon simplifying assumptions including infinite permeability for the cores $C_U$ and $C_L$ of electromagnets 11 and 12, negligible flux fringing, and negligible flux leakage. If the force $F_U$ is taken as the positive or up direction in FIG. 1, then the electromagnetic gaps become $$G_U = G_O - G_S \tag{1}$$

and $$G_L = G_O + G_S \tag{2}$$

The force produced by a single element of magnetic actuator 10 as a function of the current $I_U$ or $I_L$ and gap $G_U$ or $G_L$ can be written as $$F = \mu_O A(NI)^2/4G^2 \tag{3}$$

where $\mu_O$ is the permeability of free space, A is the cross sectional area of the magnetic bearing elements or electromagnets 11 or 12, N is the number of turns in the electromagnet coil 13 or 14, I is current $I_U$ or $I_L$, and G is the magnetic bearing element gap $G_U$ or $G_L$. Since $\mu_O$, A, and N are constants, equation 3 can be written as $$F = KI^2/G^2 \tag{4}$$

where $$K = \mu_O A N^2/4K \text{ is constant} \tag{5}$$

Using the assumption of no leakage flux, the flux in the magnetic bearing element gap is equal to the flux in the bearing element core and can be written as $$\phi = \mu_O NIA/2G \tag{6}$$

The force as a function of flux is obtained by substituting equation 6 into equation 3 which results in $$F = (1/\mu_O A)\phi^2 \tag{7}$$

Equation 7 can be written as $$F = K\phi^2 \tag{8}$$

where $$K = 1/\mu_O A \tag{9}$$

The forces produced by the upper and lower electromagnet elements 11 and 12 then becomes $$F_U = K\phi_U^2, \quad F_L = K\phi_L^2 \tag{10}$$

As shown in FIG. 1, permanent magnet (PM) flux bias is provided by permanent magnet inserts 21 and 22 in cores $C_U$ and $C_L$ of electromagnets 11 and 12, which are connected in a differential configuration. As is known, for a given input $I_I$, the amplifier driver 19 produces currents $I_U$ and $I_L$ in a direction to aid the permanent-magnet-produced flux in one PM element 21 while at the same time producing equal current in a direction to subtract from the permanent-magnet-produced flux in the other element PM 22. This results in a net force produced on the suspended element 16 in a direction dependent on the polarity of the input $I_I$ to the amplifier driver. The total force becomes:

$$F_T = F_U - F_L \tag{11}$$

which in terms of flux becomes $$F_T = K(\phi_U^2 - \phi_L^2) \tag{12}$$

established by PMs 21 and 22 and coils 13 and 14.

If the permanent magnet bias flux in the bearing gaps G with the suspended element 16 centered is defined as $\phi_O$ and differential control about this bias flux PM is assumed, the flux in the upper and lower gaps $G_U$ and $G_L$ becomes $$\phi_U = \phi_O + \phi_C \tag{13}$$

$$\phi_L = \phi_O - \phi_C \tag{14}$$

where $\phi_C$ is flux command. Substituting equations 13 and 14 into equation 12 results in $$F_T = K([\phi_O^2 + 2\phi_O\phi_C + \phi_C^2] - [\phi_O^2 - 2\phi_O\phi_C + \phi_C^2]) \tag{15}$$

which simplifies to $$F_T = 4K\phi_O\phi_C \tag{16}$$

By making the following definitions $$\phi_C = F_C \tag{17}$$

$$4K\phi_O = K_F \tag{18}$$

the total actuator force output, $F_T$, as a function of command force input, $F_C$, becomes $$F_T = K_F F_C \tag{19}$$

Figure 3:
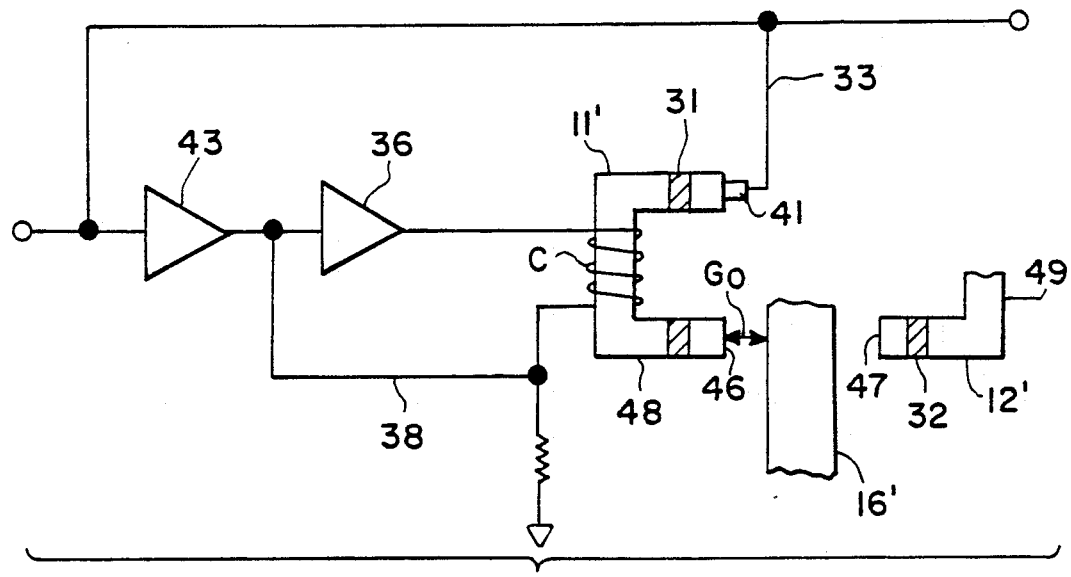
FIG. 3 is a schematic of a single flux feedback loop illustrated in FIG. 2.
Figure 2:
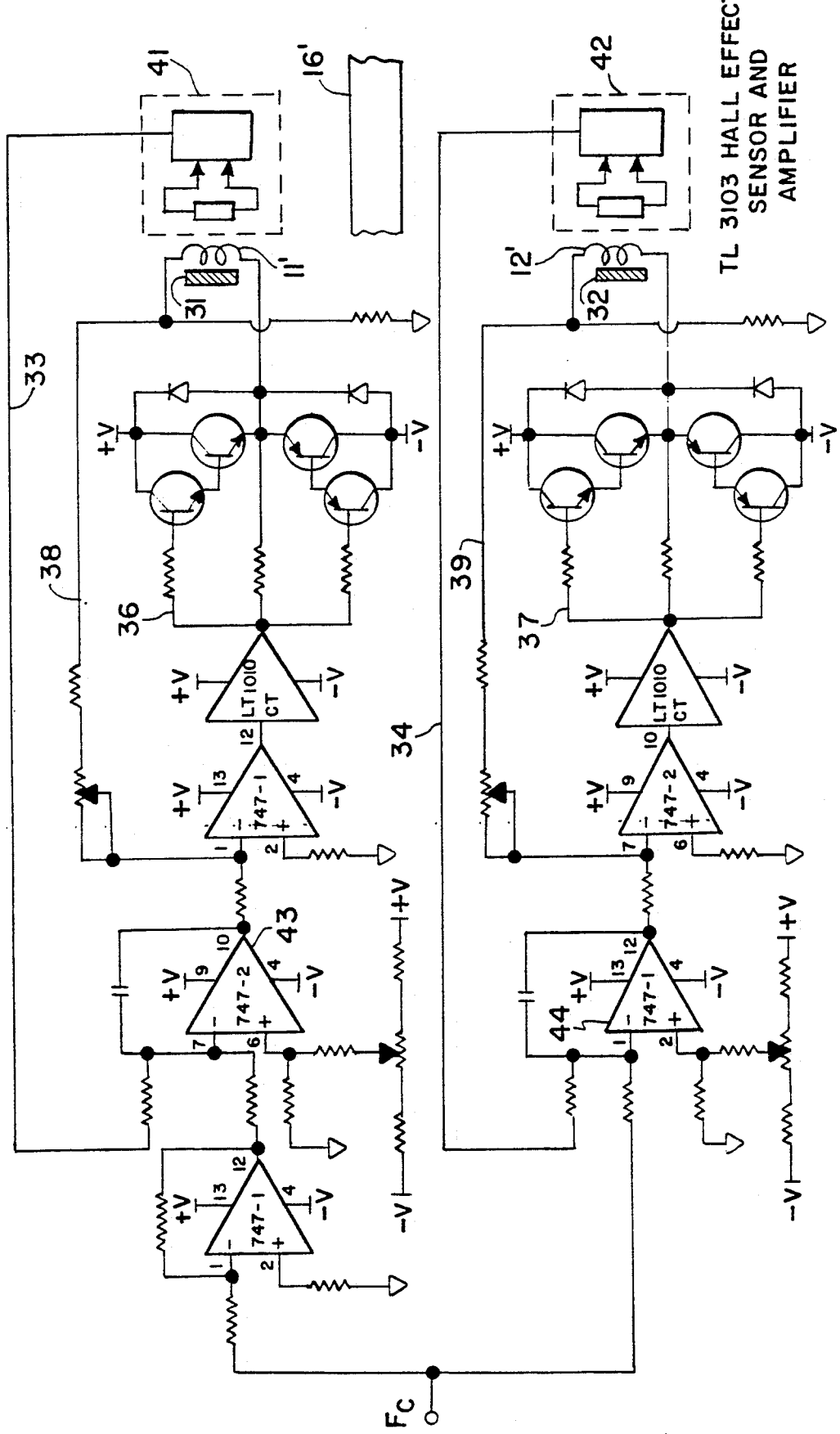
FIG. 2 is an electrical schematic of a preferred embodiment of a magnetic actuator in accordance with the invention including flux feedback and permanent magnet (PM) flux biasing.

A preferred embodiment of the invention as shown in FIG. 2 includes permanent magnets 31 and 32 in electromagnets 11' and 12' and identical flux feedback loop means 33 and 34 associated therewith as shown in FIG. 3. The flux feedback loop means 33 and 34 include actuator element power drives 36 and 37, flux sensor and associated Hall-effect sensors and amplifiers 41 and 42, and operational amplifiers 43 and 44. The Hall-effect flux sensors 41 and 42 may be mounted in pole faces 46 and 47 of each magnetic core element 48 and 49. Inner current feedback loops 38 and 39 permit even greater control of the resulting actuator force over an extended linear range of movement of a suspended element 16' formed of magnetic material.

Offset adjustment of operational amplifiers 43 and 44 is provided at the noninverting input of each amplifier. These input offset adjustments are used to null out the offset introduced by the permanent magnets 31 and 32, to provide fine adjustment between upper and lower bias flux, and to establish a baseline about which the flux feedback loop means 33 and 34 operate.

The baseline is established by adjusting the input offsets so that the upper and lower flux feedback loops 33 and 34 have zero error inputs with the suspended element 16' in the center of the gap of the electromagnets $G_O$ and the flux command input grounded. If the upper and lower permanent magnets 31 and 32 are not exactly the same strength, one flux feedback loop means may require a small offset adjustment to compensate for the difference.

In FIG. 2 the upper and lower flux feedback loop means 33 and 34 are connected in a differential configuration so that a positive input will add to the bias voltage provided by the offset input to the upper loop 33 and subtract from the offset input to the lower loop 34. Because of the high open loop gain of the input operational amplifiers, 43 and 44, the flux remains essentially constant over the operating gap range for a given input and offset voltage. The other elements shown in FIG. 2 are not specifically identified because their functions are generally known.

As shown in FIG. 3, the open loop gain of the input operational amplifier 44 of the flux feedback loop 34 is combined with the closed loop gain of the inner current feedback loop means 39 and defined as $G_F$. The gain of the flux sensor amplifier 42 is defined as $G_H$. If the resistance of the bearing element coil C of electromagnets 11' or 12' is $R_C$, the inductance is $L_C$, and the current through the coil is i, then the voltage $V_C$ across the coil, C, can be written as:

$$V_C = iR_C + L_C di/dt = iR_C(1+\tau_C S) \tag{20}$$

where $\tau_C = L_C/R_C$. The current in the coil becomes:

$$i = V_C/(R_C(1+\tau_C S)) \tag{21}$$

From equation 6 the flux, $\phi$, is:

$$\phi = K_\phi i/G \tag{22}$$

where $K_\phi = \mu_O NA/2$. Substituting for i, the flux as a function of voltage across the coil becomes:

$$\phi = K_\phi V_C/(GR_C(1+\tau_C S)) \tag{23}$$

In terms of the error voltage $\epsilon$ at the summing junction, $V_C$ becomes $$V_C = \epsilon G_F = (E_i - E_O)G_F \tag{24}$$

The Hall element flux sensor voltage, $V_H$, can be written as:

$$V_H = K_H \phi \tag{25}$$

where $K_H$ is the gain from flux input to Hall element voltage output. $E_O$ then becomes:

$$E_O = K_H G_H \tag{26}$$

and $V_C$ becomes:

$$V_C = E_i G_F - K_H G_H G_F \phi \tag{27}$$

Substituting equation 27 into equation 23 results in:

$$\phi = K_\phi(E_i G_F - K_H G_H G_F \phi)/GR_C(1+\tau_C S) \tag{28}$$

Rearranging and collecting terms results in:

$$\phi/E_i = K_\phi G_F/(K_\phi K_H G_H G_F + GR_C(1+\tau_C S)) \tag{29}$$

which can be further simplified to:

$$\phi/E_i = 1/(K_H G_H + GR_C(1+\tau_C S)/K_\phi G_F) \tag{30}$$

Since $G_F$, the open loop gain of the operational amplifier, times the closed loop gain of the current loop, is much larger than the other terms in the equation, then the approximation can be made:

$$\phi/E_i \approx 1/K_H G_H \tag{31}$$

which shows the flux to be independent of gap position.

Thus the invention uses flux feedback to differentially control flux in the gaps $G_U$ and $G_L$ of a two element magnetic actuator capable of providing bi-directional force along a single axis. The flux in the actuator gaps $G_U$ and $G_L$ are controlled about a bias flux provided by the permanent magnet inserts 31 and 32.

Alternate embodiments of the invention may include multiple element, bi-directional force, actuators of different design (for example a lifting magnet design as opposed to a horseshoe type) and different flux feedback configurations (for example a proportional, integral, derivative control loop as opposed to including the bearing element power driver and flux sensor and associated amplifier in the feedback loop of an operational amplifier).

Thus the invention uses permanent magnet (PM) flux biasing in combination with a flux feedback loop to reduce power consumption without the usual accompanying disadvantages while extending the actuator linear range and eliminating minimum bandwidth requirements. The use of current feedback loop means and flux feedback loop means in combination with permanent magnet flux biasing in accordance with the invention provides even greater control of the resulting actuator force over the extended linear range.

Thus while a preferred embodiment has been described in detail, numerous changes and modifications can be made in accordance with the principles of the invention which is to be limited only by the scope of the appended claims.

What is claimed is:

1. In a permanent magnet flux-biased magnetic actuator for adjustably positioning an element of magnetic material suspended on a single axis between opposing magnetic fields in gaps formed on opposite sides of said suspended element the improvement comprising:

a pair of opposing electromagnets, each including a magnetic core and an electrical coil therearound;

a variable source of energizing current;

a current feedback loop means interconnecting each of said electrical coils and said source of energizing current thereby energizing said electromagnets, said opposing electromagnets being positioned on opposite sides of said element suspended therebetween on said single axis to form opposing magnetic fields in gaps on opposite sides of said element whereby said suspended element is adjustably positioned on said single axis between said electromagnets in response to bi-directional forces established by changes in said energizing current in said electrical coils;

a permanent magnet in each of said electromagnets establishing a permanent magnet flux-bias in each of said respective gaps, the permanent magnetic flux-bias in one gap being offset from that in the other;

flux feedback loop means for differentially controlling the magnetic flux in said gaps about said permanent magnet flux bias; and operational amplifier means in said feedback loop means for nulling out the offset between said permanent magnet bias flux in said gaps.

2. The invention as defined in claim 1 wherein Hall-effect sensors are mounted in pole faces formed on said magnetic cores.

* * * * *